United States Patent
De Smet et al.

(10) Patent No.: US 9,696,968 B2
(45) Date of Patent: Jul. 4, 2017

(54) LIGHTWEIGHT OPTIONALLY TYPED DATA REPRESENTATION OF COMPUTATION

(71) Applicant: Microsoft Technology Licensing, LLC, Redmond, WA (US)

(72) Inventors: Bart De Smet, Bellevue, WA (US); Tihomir T. Tarnavski, Sammamish, WA (US); Savas Parastatidis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/158,680

(22) Filed: Jan. 17, 2014

(65) Prior Publication Data

US 2015/0205584 A1    Jul. 23, 2015

(51) Int. Cl.
 *G06F 9/44* (2006.01)
 *G06F 9/45* (2006.01)

(52) U.S. Cl.
 CPC ............... *G06F 8/31* (2013.01); *G06F 8/427* (2013.01)

(58) Field of Classification Search
None
See application file for complete search history.

(56) References Cited

U.S. PATENT DOCUMENTS

| | | | |
|---|---|---|---|
| 7,376,663 B1 * | 5/2008 | Meredith | |
| 7,707,544 B2 * | 4/2010 | Beust | G06F 8/30 717/106 |
| 2007/0055978 A1 * | 3/2007 | Meijer et al. | 719/331 |
| 2007/0094609 A1 * | 4/2007 | Gilboa et al. | 715/762 |
| 2008/0282238 A1 | 11/2008 | Meijer et al. | |
| 2010/0299327 A1 * | 11/2010 | Kiefer et al. | 707/736 |
| 2012/0216077 A1 * | 8/2012 | Christensen | G06F 11/3612 714/38.1 |
| 2012/0310899 A1 * | 12/2012 | Wasserman et al. | 707/687 |
| 2013/0214995 A1 * | 8/2013 | Lewin | G06F 3/1446 345/1.3 |
| 2014/0040084 A1 * | 2/2014 | Rutsch | G06Q 40/02 705/31 |
| 2014/0282082 A1 * | 9/2014 | Stollarski | H04L 51/34 715/752 |
| 2014/0282402 A1 * | 9/2014 | Eksten | G06F 9/5072 717/123 |
| 2014/0289700 A1 * | 9/2014 | Srinivasaraghavan et al. | 717/106 |

OTHER PUBLICATIONS

"Computation—Definition and More from the free Metri.am-Webster Dictionary", Mar. 9, 2013.*

(Continued)

*Primary Examiner* — Daxin Wu (57) ABSTRACT

Computation can be encoded in a lightweight and optionally typed data representation. The data representation can be specified in a prefix-based notation potentially including nested function-argument pairs. Further, the data representation can comprise optional static type information associated with at least a portion of computation. Still further, the data representation can be programming language and platform independent or surfaced in a particular programming language or platform.

20 Claims, 8 Drawing Sheets

(56) References Cited

OTHER PUBLICATIONS

"Data—Definition and More from the Free Mariam-Webster Dictionary", Apr. 12, 2013.*
"Introducing JSON", Internet article, Jan. 26, 2012.*
"The F# 3.0 Language Specification", Syme, et al., Sep. 2012.*
Unknown, "The F# 3.0 Language Specification", Published on: May 10, 2013, Available at: http://research.microsoft.com/en-us/um/cambridge/projects/fsharp/manual/spec.html.
An et al., "Static Typing for Ruby on Rails", In Proceedings of the IEEE/ACM International Conference on Automated Software Engineering, Nov. 2009, 12 pages.
Wulf et al., "Delayed Binding in PQCC Generated Compilers", In the Technical Report of the School of Computer Science, Jan. 1, 1982, 44 pages.
Duggan, Dominic, "Dynamic Typing for Distributed Programming in Polymorphic Languages", In the Technical Report CS-94-36, Dec. 1994, 65 pages.
Furr et al.,"Static Type Inference for Ruby", In Proceedings of the 24th Annual ACM Symposium on Applied Computing, Mar. 8, 2009, 8 pages.
Unknown, "The Go Programming Language", Published on: Mar. 7, 2013, Available at: http://golang.org/doc/faq.
Unknown, "StaDyn", Published on: Dec. 21, 2009, Available at: http://www.reflection.uniovi.es/stadyn/motivation.shtml.
Unknown, "Mypy Tutorial", Published on: Sep. 27, 2012, Available at: http://www.mypy-lang.org/tutorial.html (?http:?/??/?www.mypy-lang.org?/?tutorial.html?).
Esposito, Dino,"Expando Objects in C# 4.0", Published on: Jul. 3, 2010, Available at: http://msdn.microsoft.com/en-us/magazine/ff796227.aspx.

* cited by examiner

LIGHTWEIGHT OPTIONALLY TYPED DATA REPRESENTATION OF COMPUTATION

BACKGROUND

A computer program comprises instructions that describe computation that can be performed by a computer upon execution. Typically, a computation is performed over data. As simple examples, computation can correspond to a function that adds two numbers together or a query that acquires data from a database. In some instances, however, the computation, or executable code, can be represented as data itself. Among other things, a data representation of computation facilitates dynamic generation and modification of computation as well as interoperability.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to a lightweight optionally typed data representation of computation. In accordance with one aspect, computation can be represented as data with a prefix-based notation to reduce syntactic presence. According to another aspect, the representation of computation can support optional static typing, wherein data types can be present or omitted. In one embodiment, the data representation of computation can be programming language and platform independent. For example, the data representation can be based on an independent, lightweight, text-based data model, such as JavaScript Object Notation (JSON). In another embodiment, the data representation of computation can be surfaced in specific programming languages and platforms.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Representations of computation, or programming language code, are typically coupled to particular programming languages and/or platforms. By way of example, the programming language C#® has expression trees that represent code as a particular data structure. The expression trees, however, are tied to a specific type system, set of libraries, and peculiarities of the programming language. Ties to programming languages and/or platforms inhibit interoperability amongst different computer systems.

Details below generally pertain to a lightweight optionally typed data representation of computation. In accordance with one aspect, the representation can be syntactically lightweight as compared to programming languages, for example. In furtherance thereof, the data representation model can support prefix-based notation with nested function argument pairs. Consequently, the format is human-writeable as well as easy to parse and execute. In accordance with one embodiment, the data representation can be based on a lightweight text-based exchange format, such as JavaScript Object Notation (JSON), thereby further reducing syntactic presence. In accordance with another aspect, the data representation can support optional static typing. For instance, the data representation can include data fields that capture optional static type information. As a result, the data representation can operate in strongly typed, weakly typed, or untyped programming environments. In accordance with one embodiment, the data representation can be independent of programming languages and platforms. According to another embodiment, the data representation can also be surfaced in various programming languages and platforms, for instance by way of projection.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
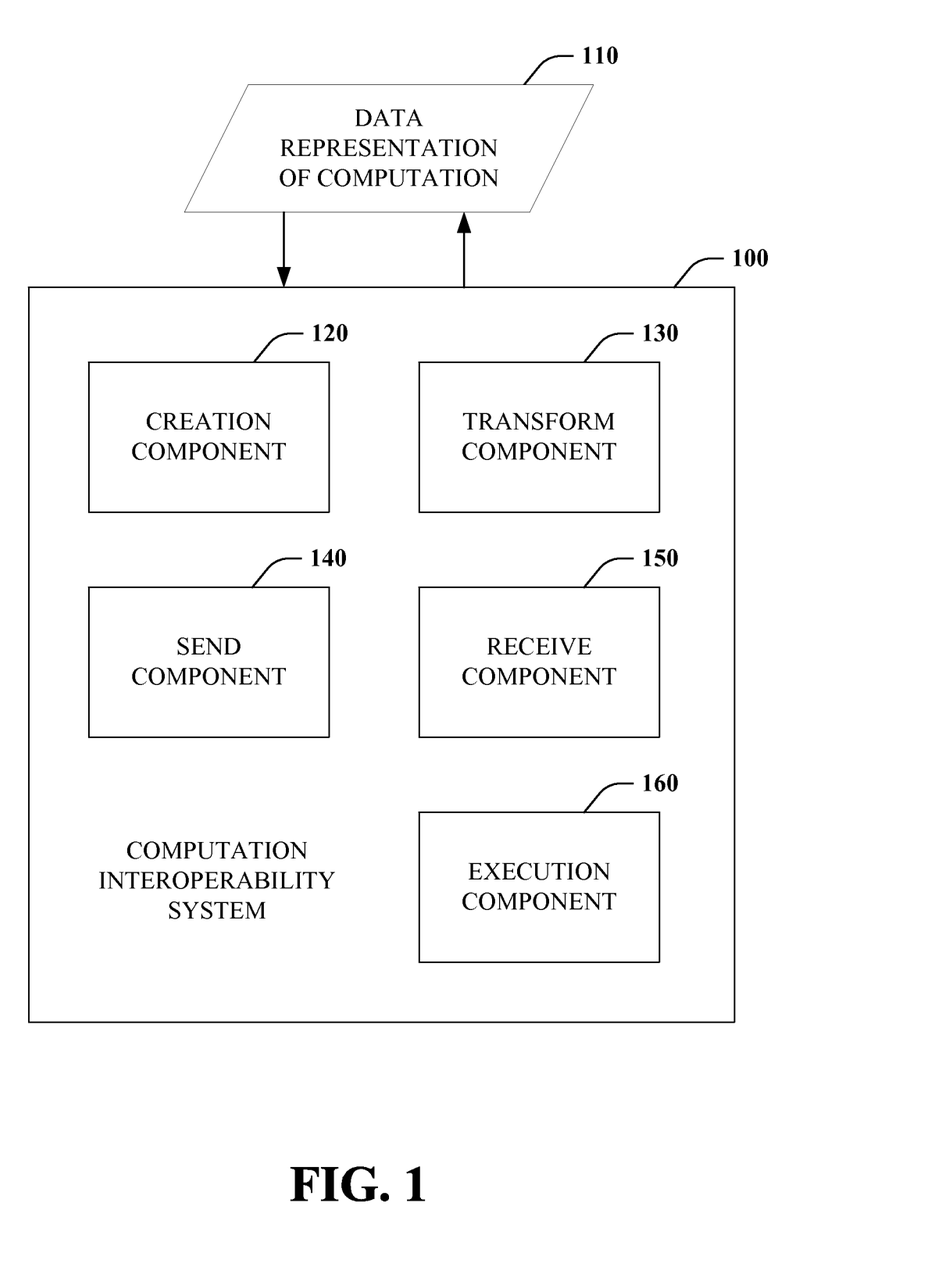
FIG. 1 is a block diagram of a computation interoperability system.

Referring initially to FIG. 1, computation interoperability system 100 is illustrated. The computation interoperability system 100 interacts with data representation of computation 110, which represents computation or programming language code as a data. More specifically, the data can be structured or modeled in accordance with a set of conventions that are to be followed.

In accordance with one aspect, the data representation of computation can be syntactically lightweight, for instance as compared to conventional programming languages. In furtherance thereof and in one instance, the data model corresponding to the data representation of computation can employ a prefix-based notation. Prefix notation places operators to the left of operands. For example, "+2 3" is equivalent to "2+3." If the number of arguments or operands a function or operation accepts (a.k.a. arity) is fixed, syntax without parentheses, brackets, or the like can be parsed without ambiguity. In other words, the syntactic presence is reduced with prefix-based notation. Furthermore, function-argument pairs or the like can be arbitrarily nested. Although not limited thereto, in one embodiment nested function-argument pairs can be represented in a tree structure. Here, a function can correspond to a parent node and each of one or more operators corresponding to child nodes of the parent node. Where nesting is utilized, a child node can correspond to another function-argument pair. Consider, for example, the expression "−8*3 2." In this instance, the parent node is "−" representing the subtraction operation with operands "8" and a nested tree with a parent node "*" corresponding to a multiplication operation with child nodes "3" and "2." Overall, prefix-based notation provides a lightweight representation that is easy to parse, interpret, or compile. Additionally, computation is human-writeable in terms of nested function-argument pairs.

In accordance with another aspect, the data representation of computation 110 can be programming language and platform independent. In this manner, the data representation of computation 110 is not tied to a particular type system, set of libraries, and peculiarities of a programming language resulting in interoperability among different computer systems that would otherwise be difficult, if not impossible. In accordance with one embodiment, this can be achieved by basing the data representation on a programming language and platform independent data model, such as, but not limited to JavaScript Object Notation (JSON). Advantageously, JSON is also a lightweight text-based exchange format, which further reduces the syntactic presence of a data representation of computation (e.g. more lightweight). Of course, to provide at least a good developer experience, the data representation of computation 110, can be surfaced in particular programming languages, which may or may not involve static type systems including JavaScript®, TypeScript, C#®, and Visual Basic®, among others.

In accordance with one embodiment, the data representation of computation 110 and corresponding data model can employ optional static typing. Consequently, data can be strongly typed, weakly typed, or untyped. In furtherance thereof, a field can be provided with respect to particular data element, for example that can comprise data representing an optional static type or optional static type information. In other words, a particular data field or slot is categorized as an optional type slot for capturing type information. According to one embodiment, context that captures types can be stored in one or more data fields that are centrally accessible to data model elements. Data fields associated with individual elements can then reference particular data types. For example, types or type information can be stored in a table on top of a core data model, wherein the top of the data model includes context in addition to a computation payload. Elements can then include a pointer or index into the table to identify corresponding type information. Alternatively, type information can be specified inline. Rather than a data field or slot including some index into a table, for instance, the data field can simply include the type information. Further, the field can be valueless or include a particular value that indicates that no type information is available. Additionally, types can be nominal, wherein data type equivalence is determined based on the name of types. However, structural data typing is also supported, wherein data type equivalence is based on the structure of types rather than explicit declarations. Still further yet, if known, the types or type information may be associated with a target or destination computer system.

In accordance with one implementation, optional type information can be stored in a set of tables that may be included in a context portion of the data model. Those tables can include a type definition table, a member definition table, and a module table that acts as a container for types and global members. Computations can refer to entries in those tables using zero-based indices instead of using a textual representation inline. For example, a call to a "Substring" method may be represented using an index-based look up in the member table or by using the "Substring" literal inline Further, the data representation of computation 110 and corresponding data model can support any type or kind of computation. In one instance, imperative code can be represented including among other things arithmetic and algebraic expressions. Further, declarative code is supported. For instance, queries, including language-integrated queries (LINQ) or LINQ queries, can be specified that describe what computation should be performed without indicating how the computation is to be performed. Moreover, substantially any computation or programming language code can be represented as data including statement bodies, among other things.

As disclosed above, model instances such as the data representation of computation 110 can be encoded a lightweight text-based exchange format such as but not limited to JavaScript Object Notation (JSON). Stated differently, the corresponding data model can be based on the JSON data model. In this case, entities represented with the JSON data model can include composition of 1) atoms such as numbers, strings, Booleans; 2) arrays or vectors with support for indexing and enumeration; and 3) object including mapping from strings onto values, referred to as properties, wherein properties in objects can have string-based names using uniform resource identifies (URIs) that conform to an ontology (e.g., a set of concepts with a domain that uses a shared vocabulary to denote types, properties, and interrelationships of concepts). A JSON-based data model exploits benefits provided by JSON including program language and platform independence and lightweight syntax. Further, since JSON is a data serialization format, data model instances, including the data representation of computation 110, are both an object model and a serialization format.

The computation interoperability system 100 interacts with the data representation of computation 110 and facilitates interoperability between data processing or computations engines, among others. The computation interoperability system 100 includes creation component 120, transform component 130, send component 140, receive component 150, and execution component 160.

The creation component 120 is configured to facilitate creation of the data representation of computation 110. In one instance, the creation component 120 can provide, be embodied as, or initiate one or more developer tools. For example, the creation component 120 can analyze a data representation of computation or portion thereof in light of a set of conventions specified by the corresponding data model and provide feedback based the set of conventions. Feedback can include error messages wherein one or more conventions are violated. Additionally, the creation component 120 can be configured to provide or initiate functionality that performs automatic completion suggestions or hits based at least on a portion of a data representation of computation and context information. Further, the creation component 120 can provide, be embodied as, or initiate execution of a type checker that employs static type information to perform static type checking. Furthermore, the type checker can infer data types using a derivation scheme, for example, utilizing any available information.

The transform component 130 is configured to transform between a lightweight optionally typed data representation of computation and a programming language and/or platform specific implementation of such a data model by way of various mappings. In one case, instances of the data representation can be surfaced in programming languages using projections, which may or may not involve static type systems. As examples, JavaScript can project data model values through JavaScript Object Notation (JSON) objects, TypeScript can ensure structural constrains using its optional static type system, and C#® and Visual Basic® can use common language runtime (CLR) objects with custom attributes to annotate properties with uniform resource identifier (URI) names. Alternatively, language integrated query (LINQ) from expression trees or TypeScript abstract syntax trees a lightweight optionally typed data representation can be produced. Translation functions should be straightforward since they simply pertain to mapping between different data structures or models.

The send component 140 and the receive component 150 are configured to facilitate transmission and acquisition the data representation of computation 110. In one embodiment, the send component 140 can provide or invoke serialization of the data representation of computation 110 and initiate transmission, and the receive component 140 can provide or invoke deserialization of the data representation of computation 110 upon acquisition. If the data representation of computation 110 is based on a JSON data model, the send component 140 and receive component 150 can simply initiate transmission and acquisition since the representation will be encoded as serialization format. Other implementations may require the data representation to be converted to and from a serialization format.

The send component 140 can also be configured optimize a data representation of computation. By way of example, and not limitation, if information is known or can be acquired about a target computer, optimization can be performed based on that information. In one particular instance, if it is known or it can be determined that that at target computer does not require static type information, static type information can be removed. This is a form of compression for a data representation of computation based at least on characteristics of a target computer.

The receive component 150 can also be configured to bind variables and initiate type checking. Upon receipt of a data representation of computation or thereafter, the receive component 150 can bind any unbound variables to local data sources and other resources. Further, static type checking can be initiated, which can be based on optionally provided type information. Additionally, the type checker can infer data types using a derivation scheme, for example. Here, binding of variables in the environment in which they executed can provide additional type information that can be utilized to infer types.

In accordance with a scenario in which the data representation of computation or corresponding data model is implemented in the C#® programming language (e.g., a general-purpose programming language), serialization can be performed using JSON arrays. Here, the first element in each array can be a discriminator of a node type (e.g., "+" for add), which indicates a kind of type (e.g., simple, array, generic, constant, add . . . ). Where typing is useful, such as for a constant, an optional type tag slot is present in the array, which can be represented inline as a type string or can refer to a context table where rich type information can be present and shared. For instance, the constant forty-two can be represented as either "[":", 42, 0]" or "[":", 42, "Integer"]," where ":" is the discriminator for constants, "42" is the value, "0" is a reference in the table, and "Integer" is the type string. Method calls, member lookups, object creations, among other things can have discriminators as well (e.g., "." for member lookups), and member names can be represented inline as a type string or refer to the context table. Further, the slot for a node in the array can specify a function or method to invoke (e.g., since many operators can be evaluated in a call-by-value manner). Hence, child nodes can be recursively evaluated and then dispatched based on the tag, for example into the "+" operator but also into any method that could be resolved from the tag name. By way of example, "Substring" can be specified as the tag, which could be bound to that operator as opposed to encoding it as a "." operation (e.g., member lookup) whose operand is a reference to the "Substring" method. Additionally, deserialization can result in an executable delegate that enables execution to be initiated. Further, in a similar context, deserialization of an untyped or weakly typed representation can leverage the dynamic language runtime (DLR) at runtime.

The execution component 160 is configured to execute or evaluate computation or code encoded as data in accordance with a particular data model as described herein. In one embodiment, execution can be performed in a recursive manner with no prior compilation step. In another embodiment, execution can involve performing a translation into a particular programming language, or in other words a host programming language. Execution can further involve mapping functions to implementations on a particular computer. If type information is available, the information can be exploited to disambiguate between different implementations. Absent type information, for example in an untyped or weakly typed scenario, dynamic type information acquired at runtime can be employed to at least disambiguate between different implementations. Dynamic type checking can also be employed to perform type checking at runtime and identify any type errors. It should be appreciated that execution can vary based on a programming language, platform, or environment. For example, to evaluate a data representation of computation implemented in JavaScript®, recursive evaluation can be performed or a "toJavaScript" visitor can be built to create script that can be evaluated directly (e.g., "eval'ed").

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the computation interoperability system 100 can employ such mechanism to determine or infer data types associated with one or more elements of a data representation of computation.

In view of the exemplary systems described above, methodologies that may be implemented in accordance with the disclosed subject matter will be better appreciated with reference to the flow charts of FIGS. 2-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 2:
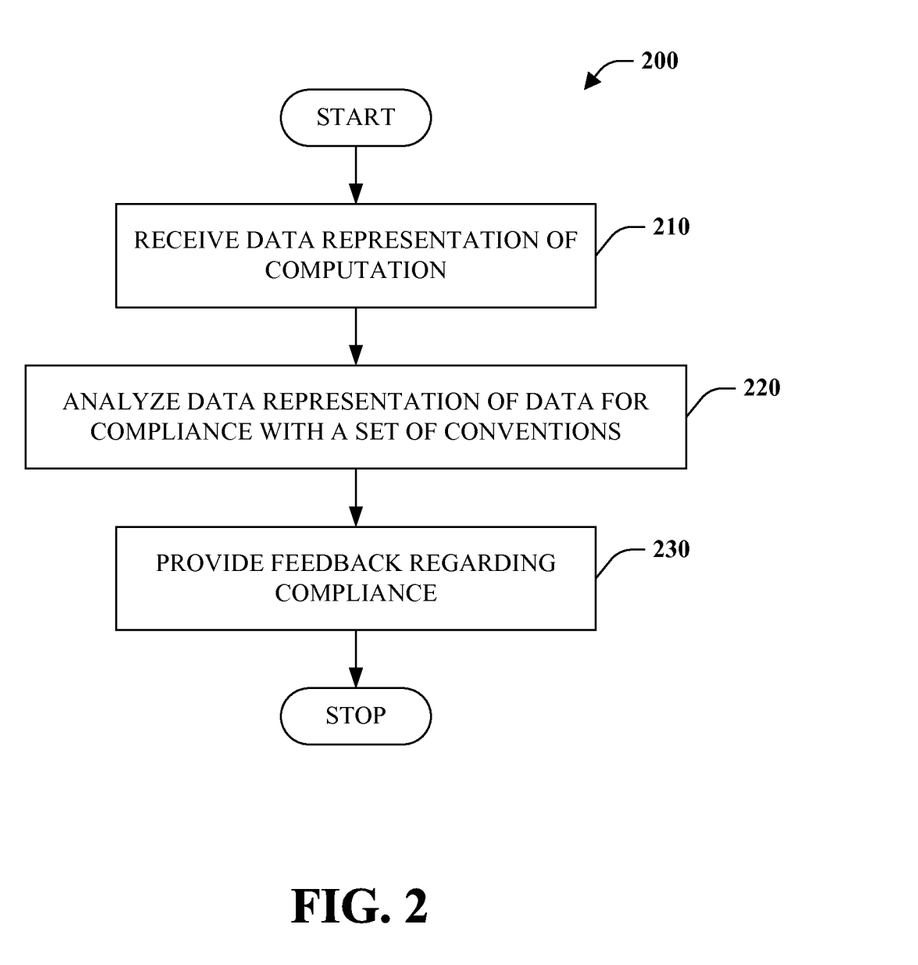
FIG. 2 is a flow chart diagram of a method of performing syntactic analysis over a data representation of computation.

Referring to FIG. 2, a method 200 of performing syntactic analysis over a data representation of computation is shown. In one embodiment, the method 200 can be performed or at least initiated by the creation component 120 in conjunction with generating a data representation of computation. Additionally, or alternatively, the method 200 can be employed by the execution component 160 as part of executing the data representation of computation. At reference numeral 210, a data representation of computation or portion thereof is received, retrieved, or otherwise obtained or acquired. At numeral 220, the data representation of computation or portion is analyzed for compliance with a set of conventions established by a data model for data representation of computation. For example, a data representation of computation can be checked to determine whether or not the data representation employs appropriate syntax associated with a JSON data model, utilizes a prefix-based notation, and includes a data slot or field for optional type information. In one instance, such analysis can correspond to parsing or syntactic analysis. At reference 230, feedback can be provided regarding compliance. For instance, one or more errors can be identified if the data representation of computation does not obey the set of conventions. Such feedback can be provided by error messages, or highlighting a portion of the data representation that is noncompliant.

Figure 3:
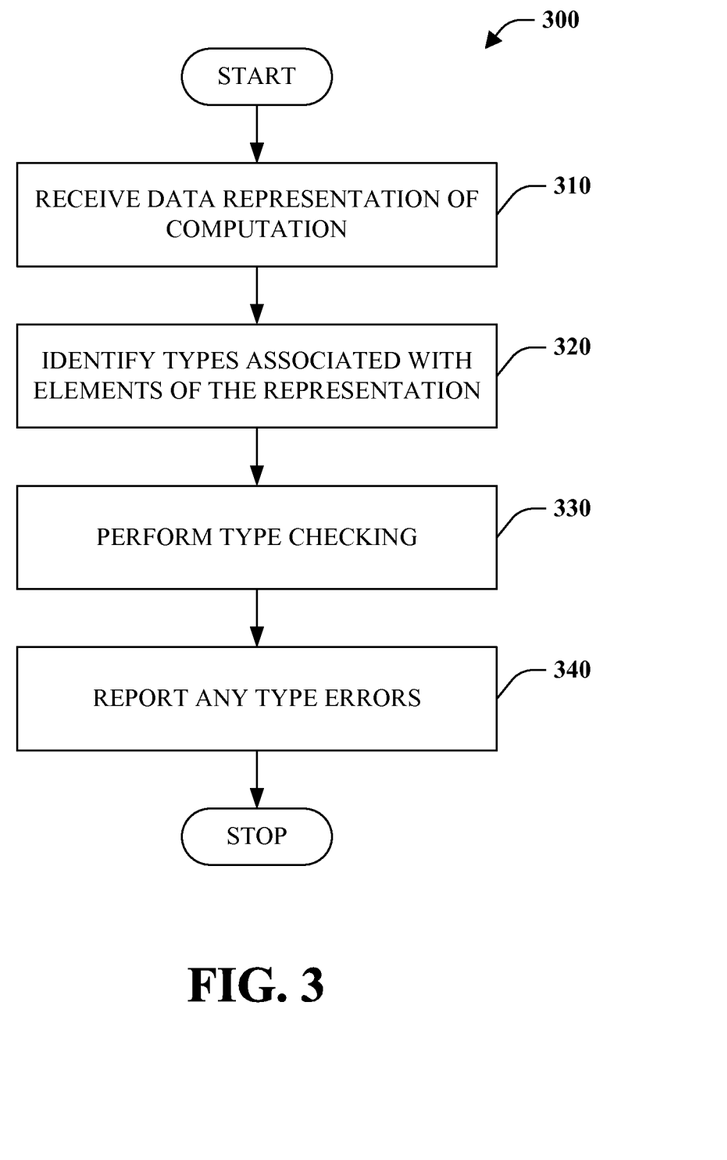
FIG. 3 is a flow chart diagram of a method of performing semantic analysis over a data representation of computation.

FIG. 3 a method 300 of performing semantic analysis associated with a data representation of computation is depicted. The method 300 can be performed or invoked by at least the creation component 120 or the execution component 160. At reference numeral 310, a data representation of computation or a portion thereof is received, retrieved, or otherwise obtained or acquired. At numeral 320, types associated with elements of the data representation of computation are identified or otherwise determined or inferred. For example, optionally provided static type information can be identified within the representation. Additionally, various mechanisms can be employed to infer types, for example from structure and types of other elements. Further, some types can be determined or inferred dynamically at runtime. At reference 330, type checking can be performed with respect to the computation. Any type errors detected during type checking can be reported at reference numeral 340. For example, typing errors can be identified by way of highlighting, or like mechanism (e.g., squiggly underline), or with error messages within a code editor during development. Additionally, type errors during execution can result in a runtime error, and the type errors can be reported in conjunction with the runtime error.

Figure 4:
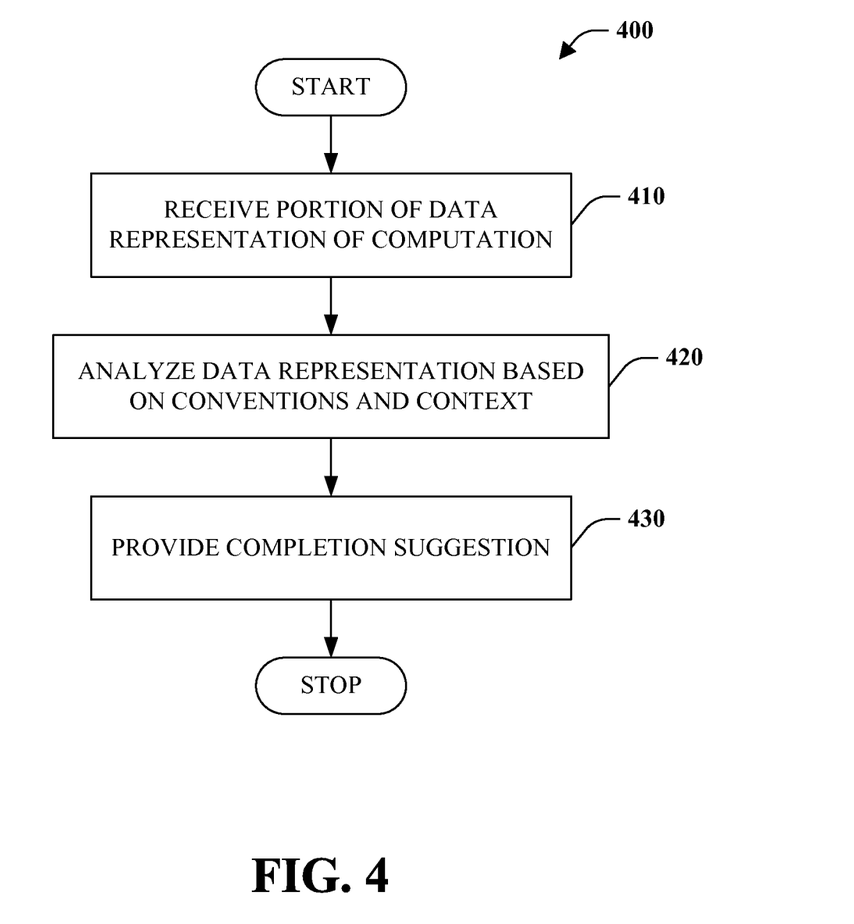
FIG. 4 is a flow chart diagram of a method of facilitating creation of a data representation of computation.

FIG. 4 illustrates a method 400 of facilitating creation of a data representation of data. The method 400 can be performed or initiated by the creation component 120 in accordance with one embodiment. At reference numeral 410, a portion of a data representation is received, retrieved, or otherwise acquired or obtained. For example, the portion can correspond to partial input by a developer in a code editor of an integrated development environment (IDE). At numeral 420, the portion of the data representation of computation is analyzed based on conventions of a data model for data representation of computation as well as available context information including type information, among other things. At reference numeral 430, completion suggestions or hints can be provided based on the conventions and context information to complete a portion of the data representation of computation. For example, based on prior specification of a function or operation, optional static types can be suggested for arguments or operands based on those types supported by the function or operation.

Figure 5:
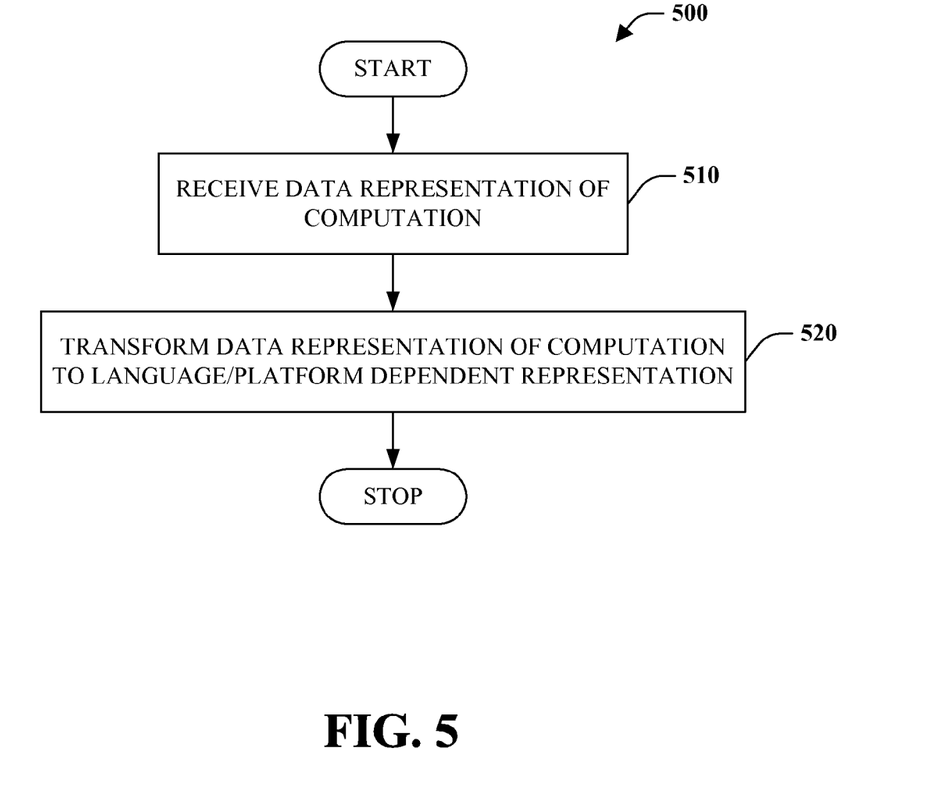
FIG. 5 is a flow chart diagram of method of transforming a data representation of computation.

FIG. 5 is a flow chart diagram of a method 500 of transforming a data representation of computation. At reference numeral 510, a data representation of computation is received, retrieved, or otherwise acquired or obtained. At numeral 520, the data representation of computation is transformed or utilized to produce a program language or platform dependent representation of the data representation of computation. In other words, the data representation of computation is surfaced within a particular programming language, for instance by projections. For example, an expression tree exposed by the C#® programming language can be generated from a data representation of computation.

Figure 6:
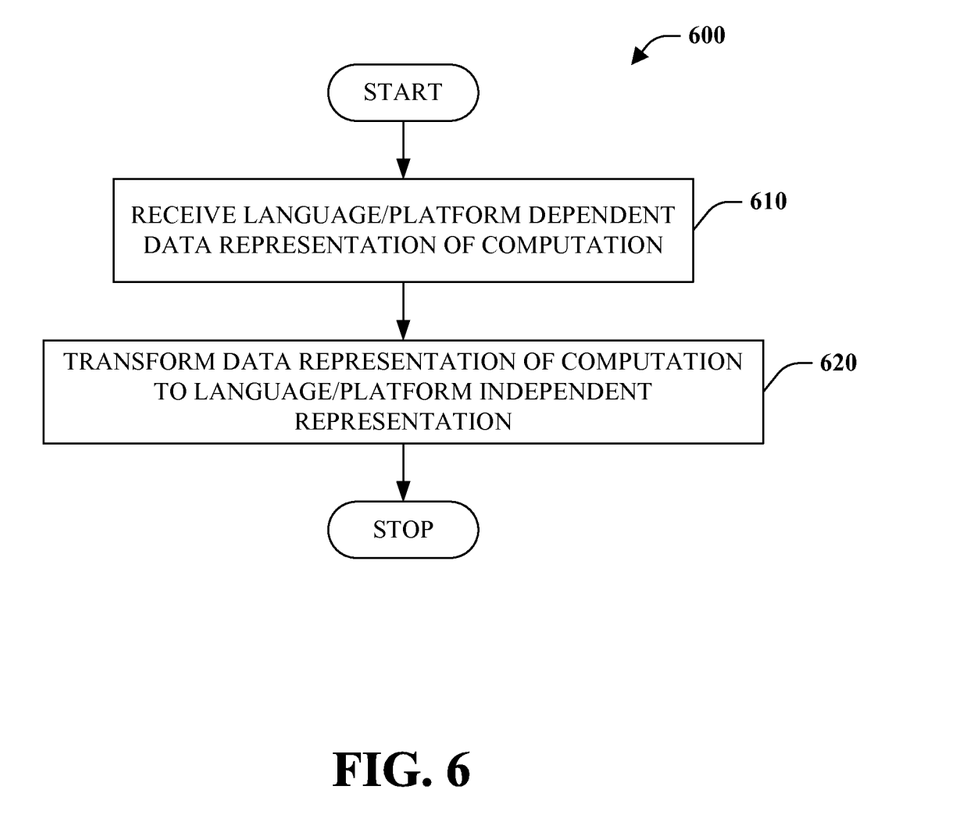
FIG. 6 is a flow chart diagram method of data representation of computation transformation.

FIG. 6 is a flow chart diagram of a method 600 of data representation of computation transformation. At reference 610, a language and/or platform dependent data representation of computation is received, retrieved, or otherwise obtained or acquired. At numeral 620, the language or platform dependent representation is transformed or utilized to generate a data representation of computation independent of a programming language and/or platform, for example in accordance with the data model described herein. By way of example and not limitation, an expression tree representation of a language integrated query in the C#® or Visual Basic® programming languages operating over the .NET framework can be transformed or utilized to produce a data representation of computation independent of the programming language and platform.

Figure 7:
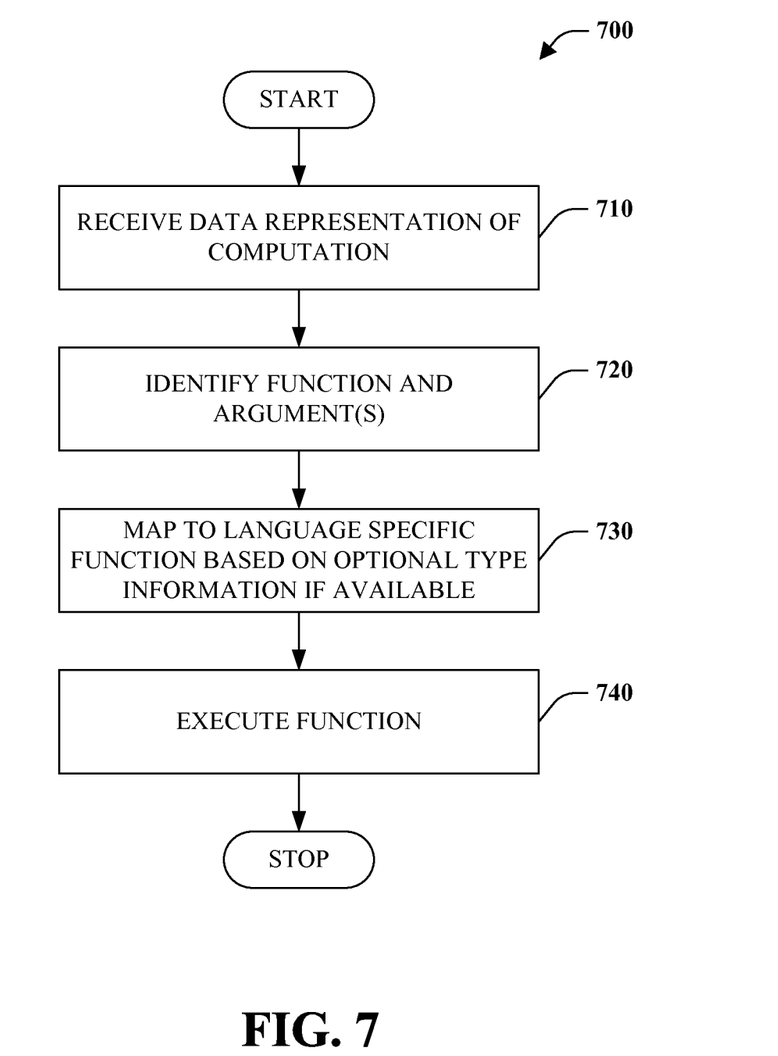
FIG. 7 is a flow chart diagram of method execution with respect to a data representation of computation.

FIG. 7 depicts a method of execution with respect to a data representation of computation. At reference numeral 710, a data representation of computation is received, retrieved, or otherwise obtained or acquired. For example, the data representation of computation can be received by a server computer from a client computer for execution. At numeral 720, a function and one or more arguments specified in the data representation are identified. In accordance, with one embodiment such identification can be performed recursively with respect to nested elements. At reference numeral 730, the function is mapped to a language specific function implementation. Further, such mapping can be performed based on types including optional type information, if available. In this manner, different implementations of functions can be disambiguated based on types. Further, even if type information has not been provided, it may be able to be inferred based on one or more available or inferred types associated with arguments. In other words, a type associated with a parent node may be able to be determined or inferred based on data types of one or more child nodes. At reference 740, execution of the language specific function is initiated. Further, execution can be performed in a recursive manner, such that child nodes are evaluated first and their results provided to a parent node for execution, for example.

What follows is a concrete example of a data representation of computation. This example is not intended to limit the disclosed subject matter in any way. Rather, the example is provided solely to provide clarity and understanding regarding one or more disclosed aspects.

Consider the following data representation of a query that employs prefix-based notation and nested function-argument pairs based on a JSON data model:

```
["( )", ["$", "rx:/subscribe"], [
    ["( )", ["$", "rx:/operators/select"], [
        ["( )", ["$", "rx:/operators/where"], [
            ["$", "bing:/streams/weather"],
            ["=>", ["$", "x"],
                ["=", [".", ["$", "x"], "entities:/weather/city"],
        ["::", "Bellevue"]]
            ]
        ],
        ["=>", ["$", "x"],
            ["new", { "Uri": ["::", "http://foo"] },
                { "Body": [".", ["$", "x"],
                    "entities:/weather/temp" ] }]
        ]
    ],
    ["$", "bing:/observers/http"]
]
```

Also, consider a target computer system has:

- bing:/streams/weather bound to IReactiveQbservable<WeatherInfo> (a type in an event processor system)
- bing:/observers/http bound to IReactiveQbserver<HttpPost> (a type in an event processor system)
- rx:/operators/where bound to Func<IReactiveQbservable<T>, Func<T, bool>, IReactiveQbservable<T>>
- rx:/operators/select bound to Func<IReactiveQbservable<T>, Func<T, R>, IReactiveQbservable<R>>

This query could have been written in C#® as:

```
ctx.Weather
    .Where(x => x.City == "Bellevue")
    .Select(x => new HttpPost { Uri = "http://foo", Body = x.Temperature })
    .Subscribe(ctx.HttpPost)
```

Alternatively, the above query could have been written in JavaScript® as:

```
ctx.Weather
    .filter(function (x) { return x["entities:/weather/city"] == "Bellevue"; })
    .map(function (x) { return { "Uri": "http://foo", "Body": x.Temperature }; })
    .subscribe(ctx.HttpPost)
```

Here, the representation resembles a tree and omits type information. In addition, notice how the methods or functions used to capture the tree can be mapped onto a uniform resource identifier (URI) for example to represent query operators or data properties that conform to some ontology (e.g., using metadata attributes on methods and properties in C#®).

Furthermore, despite the lack of static type information, typing can be completely reconstructed in a statically typed environment by means of unification against types of know artifacts. For example, when binding unbound variables "bing:/streams/weather" and "bing:/observers/http" above, generic parameter types of the observable and observer can be inferred. The function or operator definitions for "where" and "select" use generic wildcard placeholder types that can be unified against already inferred types. As such, the whole data representation, or tree, can be typed. If typing cannot proceed in a sub-tree, dynamic typing can be utilized during execution.

Structural typing support is also shown in the above example. The "HttpPost" type is not required to be included in the query by a client, for instance. Upon deserialization, the type can be bound to an existing type (e.g., obtained through unification as described above), or a type can be created on dynamically (e.g., using lightweight code generation), or the use sites of the unknown object can be turned into dynamic call sites (e.g., using an expando object).

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
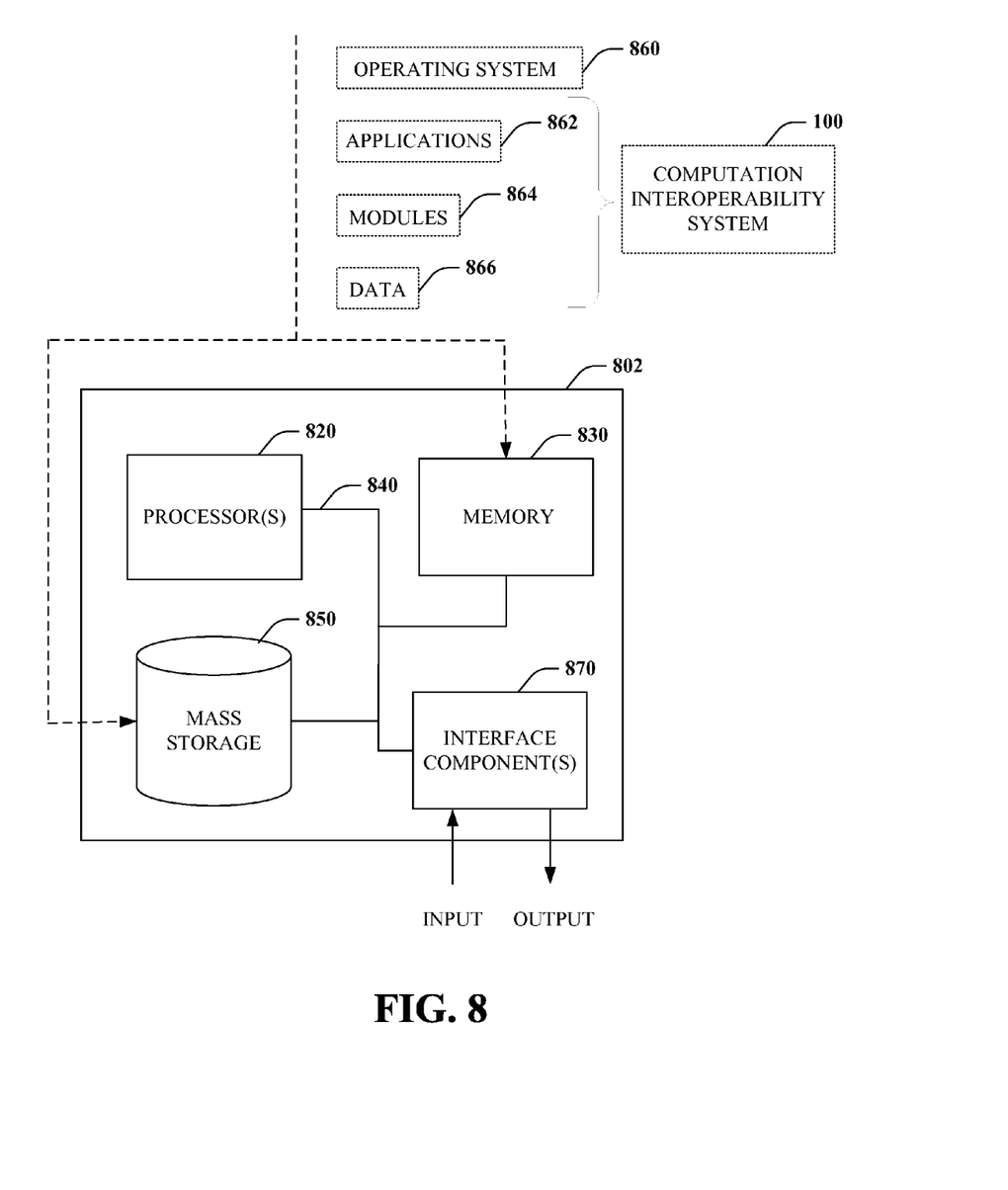
FIG. 8 is a schematic block diagram illustrating a suitable operating environment for aspects of the subject disclosure.

In order to provide a context for the claimed subject matter, FIG. 8 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 8, illustrated is an example general-purpose computer or computing device 802 (e.g., desktop, laptop, tablet, server, hand-held, programmable consumer or industrial electronics, set-top box, game system, compute node . . . ). The computer 802 includes one or more processor(s) 820, memory 830, system bus 840, mass storage 850, and one or more interface components 870. The system bus 840 communicatively couples at least the above system components. However, it is to be appreciated that in its simplest form the computer 802 can include one or more processors 820 coupled to memory 830 that execute various computer executable actions, instructions, and or components stored in memory 830.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that can be used to store, as opposed to transmit, the desired information accessible by the computer 802. Accordingly, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 830 and mass storage 850 are examples of computer-readable storage media. Depending on the exact configuration and type of computing device, memory 830 may be volatile (e.g., RAM), non-volatile (e.g., ROM, flash memory . . . ) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage 850 includes removable/non-removable, volatile/non-volatile computer storage media for storage of large amounts of data relative to the memory 830. For example, mass storage 850 includes, but is not limited to, one or more devices such as a magnetic or optical disk drive, floppy disk drive, flash memory, solid-state drive, or memory stick.

Memory 830 and mass storage 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, computation interoperability system 100, or portions thereof, can be, or form part, of an application 862, and include one or more modules 864 and data 866 stored in memory and/or mass storage 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the computation interoperability system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, Fire Wire . . . ) or an interface card (e.g., sound, video . . . ) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 870 can be embodied as an output peripheral interface to supply output to displays (e.g., LCD, LED, plasma . . . ), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer storage medium encoding computer executable instructions which, when executed by a processor, performs a method, comprising:
    generating a first field of a data structure, wherein the first field comprises data that represents a computation in a prefix notation, wherein the data represents one or more computer instructions of the computation that is contained in another data structure and is associated with a programming language;
    generating a second field of the data structure, wherein the second field comprises data that represents optional static type information associated with at least a portion of the computation, and wherein the first field and the second field are encoded in a programming-language-independent format; and
    optimizing the data structure based, at least in part, on information about a target computing device that receives the data structure.

2. The computer storage medium of claim 1, wherein the first field comprises data representing a declarative computation.

3. The computer storage medium of claim 1, wherein the computation is programming language code.

4. The computer storage medium of claim 1, wherein the first field comprises data representing the computation in nested function-argument pairs.

5. The computer storage medium of claim 1, wherein the first field and the second field are represented in a platform independent format.

6. The computer storage medium of claim 1, wherein the first field and the second field are encoded in a lightweight text-based exchange format.

7. The computer storage medium of claim 6, wherein the lightweight text-based exchange format is JavaScript object notation.

8. The computer storage medium of claim 1, further comprising a third field including data representing a reference into the optional static type information.

9. The computer storage medium of claim 1, further comprising a third field including data representing inline specification of the optional static type information.

10. The computer storage medium of claim 1, wherein the first field includes data representing a query.

11. A method, comprising:
    receiving a data representation of a programming language code in a data exchange format that reduces a syntactic presence of the programming language code, wherein the data representation:
        is encoded in a prefix-based notation;
        is optimized based, at least in part, on information about a target computing device that executes the data representation; and
        includes optional static types; and
    executing the data representation.

12. The method of claim 11, further comprising transforming the data representation into a second representation supported by a programming language prior to executing the data representation.

13. The method of claim 11, further comprising mapping one or more functions of the data representation to implementations of the one or more functions on a computer.

14. The method of claim 13, further comprising mapping the one or more functions based on one or more available static types.

15. The method of claim 13, further comprising mapping the one or more functions based on dynamic types.

16. The method of claim 11, wherein executing the data representation comprises evaluating a query over a set of data.

17. A system, comprising:
    a processor; and
    a memory for storing instructions which, when executed by the processor, performs a method comprising:
        initiating transmission of a data representation of a computation in a prefix notation from a source computer to a target computer, the data representation being a programming language and platform independent data exchange format that captures code of the computation as data and comprises at least one data field representing optional static type information; and
        optimizing the data representation based, at least in part, on information about the target computer.

18. The system of claim 17, wherein the data representation comprises nested function-argument pairs.

19. The system of claim 17, wherein the computation is programming language code.

20. The system of claim 19, wherein the data exchange format reduces a syntactic presence of the programming language code.

* * * * *